US012151252B2

(12) United States Patent
Bitzel et al.

(10) Patent No.: US 12,151,252 B2
(45) Date of Patent: Nov. 26, 2024

(54) APPLICATION NOZZLE

(71) Applicant: Atlas Copco IAS GmbH, Bretten (DE)

(72) Inventors: Heiko Bitzel, Karlsruhe (DE); Sergej Eckstein, Pforzheim (DE)

(73) Assignee: Atlas Copco IAS GmbH, Bretten (DE)

( * ) Notice: Subject to any disclaimer, the term of this patent is extended or adjusted under 35 U.S.C. 154(b) by 538 days.

(21) Appl. No.: 17/605,722

(22) PCT Filed: Mar. 16, 2020

(86) PCT No.: PCT/EP2020/057098

§ 371 (c)(1),
(2) Date: Oct. 22, 2021

(87) PCT Pub. No.: WO2020/239283

PCT Pub. Date: Dec. 3, 2020

(65) Prior Publication Data

US 2022/0212209 A1 Jul. 7, 2022

(30) Foreign Application Priority Data

May 24, 2019 (DE) ..................... 10 2019 113 896.5
Aug. 6, 2019 (DE) ..................... 20 2019 104 322.9

(51) Int. Cl.
*B05B 1/04* (2006.01)
*B05C 5/02* (2006.01)

(52) U.S. Cl.
CPC ............ *B05B 1/044* (2013.01); *B05C 5/0254* (2013.01)

(58) Field of Classification Search
CPC .................... B05B 1/044; B05C 5/0254–0266
(Continued)

(56) References Cited

U.S. PATENT DOCUMENTS 1,133,711 A * 3/1915 Cornelius ............... F23D 11/38 239/591
4,201,534 A * 5/1980 Phipps .................... B29C 48/08 425/461

(Continued)

FOREIGN PATENT DOCUMENTS

DE 10 2006 012 373 B3 6/2007
DE 10 2011 011 850 A1 8/2012

(Continued)

OTHER PUBLICATIONS

International Search Report of PCT/EP2020/057098, mailed Oct. 6, 2020.

(Continued)

*Primary Examiner* — Cody J Lieuwen
(74) *Attorney, Agent, or Firm* — Collard & Roe, P.C.

(57) ABSTRACT

An application nozzle for applying a viscous material to workpieces has a nozzle body, through which an application duct extends from a material inlet to a material outlet. The nozzle body has, in a first spatial direction, a width greater than a thickness in a second spatial direction perpendicular to the first direction. The application channel widens towards the outlet in the first direction. A nozzle holder has a main body and two clamping plates. A material feed duct extends through the main body, leading into the inlet at a feed opening. The clamping plates, bearing on opposite nozzle body side faces, fix the nozzle body releasably to the main body. The clamping plates are separate components fixed releasably to the main body and the nozzle body, and/or the nozzle body has two nozzle plates bearing flat against one another, with at least one duct portion between the nozzle plates.

23 Claims, 5 Drawing Sheets

Figure 1A:
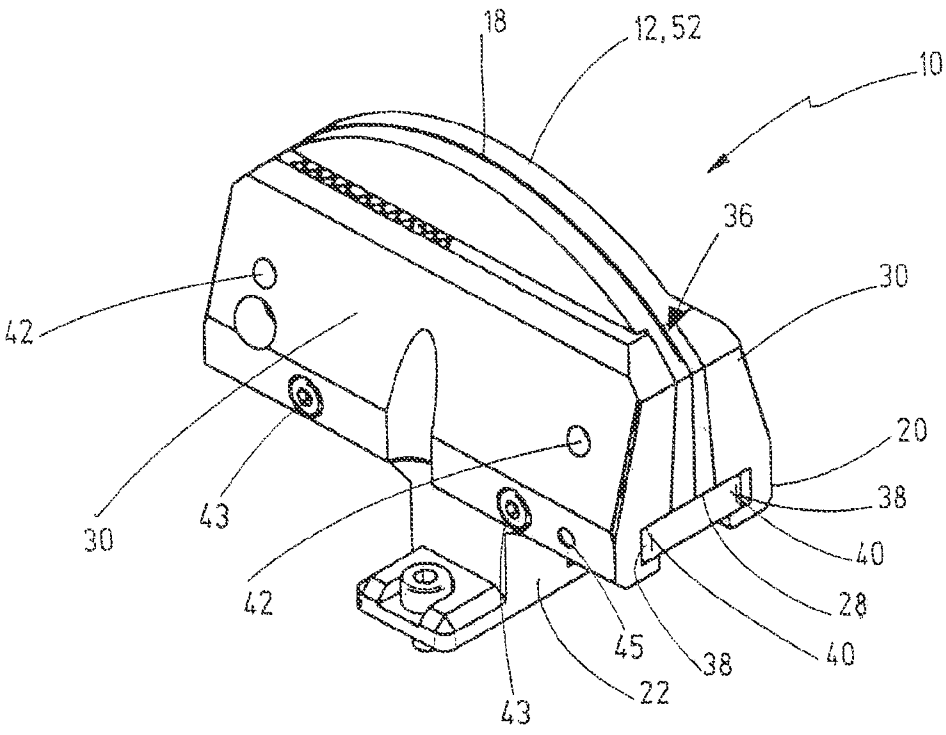

(58) Field of Classification Search
USPC .......................................... 239/592, 597, 598
See application file for complete search history.

(56) References Cited

U.S. PATENT DOCUMENTS

| | | | | |
|---|---|---|---|---|
| 4,513,915 | A * | 4/1985 | Kohler ................. | D21H 5/0042 239/592 |
| 5,283,990 | A * | 2/1994 | Shank, Jr. ............... | B05B 1/044 239/592 |
| 5,785,253 | A * | 7/1998 | Ueberschar ............ | D21H 23/32 239/455 |
| 6,375,088 | B1 * | 4/2002 | Warrick .................... | B08B 3/02 239/419 |
| 2014/0203115 | A1 | 7/2014 | Kraft et al. | |
| 2017/0036243 | A1 | 2/2017 | Volpato et al. | |
| 2017/0113228 | A1 * | 4/2017 | Forstpointner ....... | B02C 19/068 |
| 2019/0344291 | A1 | 11/2019 | Vandepitte | |
| 2020/0179955 | A1 | 6/2020 | Kraft et al. | |
| 2020/0179967 | A1 | 6/2020 | Kraft et al. | |

FOREIGN PATENT DOCUMENTS

| | | | |
|---|---|---|---|
| DE | 10 2016 010 223 | A1 | 2/2017 |
| DE | 10 2016 014 270 | A1 | 5/2018 |
| DE | 10 2016 014 271 | A1 | 5/2018 |
| DE | 10 2017 101 336 | A1 | 7/2018 |
| DE | 10 2017 103 329 | A1 | 8/2018 |
| JP | 5095829 | B2 | 12/2012 |

OTHER PUBLICATIONS

English translation of the International Preliminary Report on Patentability and Written Opinion of the International Searching Authority in PCT/EP2020/057098, dated Dec. 2, 2021.

German Office Action in 10 2019 113 896.5, dated Jan. 13, 2020, with English translation of relevant parts.

* cited by examiner

APPLICATION NOZZLE

CROSS REFERENCE TO RELATED APPLICATIONS

This application is the National Stage of PCT/EP2020/057098 filed on Mar. 16, 2020, which claims priority under 35 U.S.C. § 119 of German Application No. 10 2019 113 896.5 filed on May 24, 2019 and German Application No. 20 2019 104 322.9 filed on Aug. 6, 2019, the disclosures of which are incorporated by reference. The international application under PCT article 21(2) was not published in English.

The invention relates to an application nozzle for applying a viscous material to workpieces, in accordance with the preamble of claim 1.

Such application nozzles, also called flat-stream nozzles, serve for producing a wide spray jet, for example for applying a varnish for seam sealing or an insulation material that must be applied flatly to a workpiece. Such application nozzles are used, in particular, for coating car body components in the automotive industry, but also for coating components of other devices, such as, for example, built-in appliances for kitchens. In order to obtain a wide spray jet, the application channel widens in a first spatial direction, toward the material outlet, in which direction the width of the application nozzle is measured, which width is generally many times greater (for example 5 to 10 times greater) than the thickness of the nozzle body, measured in a second spatial direction perpendicular to the first spatial direction. This can be accompanied, both in the case of the application nozzles according to the state of the art and in the case of the application nozzle according to the invention, by a narrowing of the application channel in the second spatial direction. The nozzle body is mounted on a nozzle holder through which a feed channel extends, by way of which channel the material is passed into the application channel. The nozzle body is releasably fixed in place on the nozzle holder, wherein the nozzle holder has two clamping plates, in the case of previously known application nozzles, which plates lie against side surfaces of the nozzle body that face away from one another, and hold the body clamped in place in an interstice that forms between them. In this regard, in the case of previously known application nozzles, one clamping plate is connected, in one piece, with the base body of the nozzle holder that has the feed channel, while the other clamping plate is releasably fixed in place on the plate and on the nozzle body. However, this simple structure causes a disadvantage: An edge is formed at the transition between the base body of the nozzle holder and the clamping plate configured in one piece with it, which edge always has a radius due to the one-piece configuration. At this edge, a corresponding edge of the nozzle body cannot be inserted with precise fit due to this radius, so that a leak can occur between the feed channel and the application channel. An application nozzle is known from DE 10 2016 014 271 A1, which nozzle has a two-part apparatus as a holder.

It is therefore the task of the invention to further develop an application nozzle of the type stated initially, in such a manner that its tightness is improved.

This task is accomplished, according to the invention, by means of an application nozzle having the characteristics of claim 1. Advantageous further developments of the invention are the object of the dependent claims.

The invention is based on the idea of being able to structure the edges that delimit the interstice between the clamping plates, which interstice is intended to hold the nozzle body, as edges that are as sharp as possible and have a small radius, by means of the configuration of the two clamping plates as separate components and their releasable fixation on the base body and on the nozzle body, so that the nozzle body can be well fitted between the clamping plates, and a great degree of tightness exists at the transition from the base body to the nozzle body. The tightness is even further improved if, in accordance with an advantageous further development, the side surfaces of the nozzle body are inclined at an acute angle relative to one another, proceeding from the base body, wherein this angle is preferably maximally 30° and, in particular, maximally 10°. In particular if the clamping surfaces of the clamping plates, which surfaces lie against the side surfaces, run toward one another at the same angle, proceeding from the base body, these surfaces press the base body against the nozzle body when the latter is being clamped in place.

It is advantageous if the side surfaces extend, in each instance, all the way to an end region, which projects out of the interstice between the two clamping parts and has the material outlet, at which region the thickness of the nozzle body increases. A greater thickness of the nozzle body in the region of the material outlet increases the stability of the latter, so that it is mechanically more resistant to mechanical stresses, such as during cleaning, for example. In particular, the end region can be configured as a step that projects out of the side surfaces on both sides.

It is advantageous if the clamping plates lie flatly against one of the side surfaces of the nozzle body with a clamping surface, in each instance. In this way a good clamping effect is achieved. Furthermore, it is preferred that the clamping plates each have a groove in which part of the base body is held. This facilitates positioning of the clamping plates with reference to the base body. It is practical if the clamping plates and the nozzle body are fixed in place on one another by means of at least one screw and/or at least one pin. This represents a particularly simple type of attachment.

The nozzle body is preferably produced from hard metal. In this regard, a hard metal is understood to be a metal-matrix composite material, in which the hard substances, present in particle form, are held together by means of a matrix composed of metal. Hard substances that can be used are, in particular, metal carbides or metal nitrides, such as tungsten carbide, titanium carbide, titanium nitride, niobium carbide, tantalum carbide or vanadium carbide, for example. It is true that hard metal is a more expensive material than metal. However, it is significantly stronger and more wear-resistant, in particular with regard to abrasive viscous media.

According to an advantageous further development of the invention, which also represents an independent inventive improvement as compared with the state of the art, the nozzle body has two nozzle plates that lie flatly against one another, between which at least a section of the application channel is situated. It is advantageous if the nozzle plates lie loosely against one another and are pressed against one another by means of the clamping plates. It is possible that one of the nozzle plates has a depression that forms the application channel, while the other nozzle plate is ground to be flat and merely covers the depression, thereby delimiting the application channel on one side. However, it is preferred for the two nozzle plates to have the same construction. In this regard, it is preferred that each of the nozzle plates, on the side facing the other nozzle plate, has a delimitation surface that delimits the application channel, at least in certain sections; a step that projects out of the delimitation surface, having a first contact surface that runs parallel to the delimitation surface and lies against the other nozzle plate, and a second contact surface that follows the delimitation surface in planar manner, against which the first contact surface of the other nozzle plate lies. This solution according to the invention, in accordance with the also independent claim 10, offers the advantage that the nozzle body is easier to produce, in particular if it is made from hard metal. In this regard, it is preferred that the nozzle plates lie against one another at contact surfaces relative to which the second spatial direction extends transversely and preferably perpendicular. It is advantageous if the nozzle plates are each produced in one piece and preferably produced from hard metal.

Furthermore, it is preferred that the application channel has a first section that extends from the material inlet and is delimited by the clamping plates on two sides, and a second section that extends toward the material outlet and is enclosed all around by the nozzle body. In this regard, it is possible that the application channel widens in the first spatial direction only in its second section. However, it is preferred that the first section also widens in the first spatial direction, proceeding from the material inlet toward the second section. In particular if the second section is delimited by the steps on sides that lie opposite one another, the nozzle plates can simply be produced from hard-metal plates. In this regard, a cut-out for forming the first section of the application channel is cut out of the hard-metal plate by means of erosion or cutting, and subsequently the delimitation surface and the second contact surface are produced by means of grinding along an edge that delimits the step. In this regard, only the contact surfaces and the surfaces that delimit the application channel have to be ground, while grinding of the side surfaces of the nozzle body, which surfaces face one another, is not necessary.

It is possible that sealing takes place by means of sealing contact of the nozzle body on the nozzle holder. However, it is also possible that the first section and an end section of the feed channel that opens into the first section at the material inlet are lined, at least in part, by means of a sealing element that lies against the base body and against the clamping plates, so as to improve the sealing effect. In this regard, it is preferred that the sealing element is produced in one piece from a thermoplastic material, preferably from polyoxymethylene (POM) or polytetrafluoroethylene (PTFE). It is advantageous if the sealing element has an outlet gap that opens into the second section, the width of which, measured in the first spatial direction, is multiple times greater than its thickness measured in the second spatial direction. In this regard, it is practical if the width of the outlet gap is maximally twice as great as the thickness of the second section, measured in the second spatial direction, and it is preferably equal in size in the sense that it differs from the thickness of the second section by at most 10%.

Figure 1B:
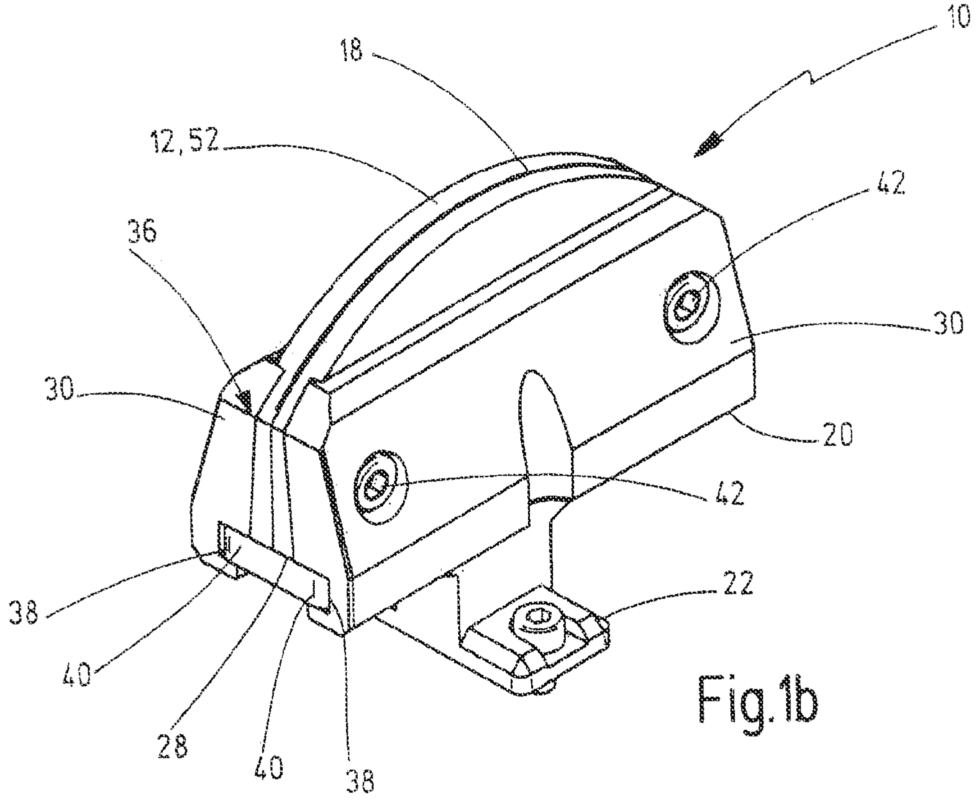
Figure 2A:
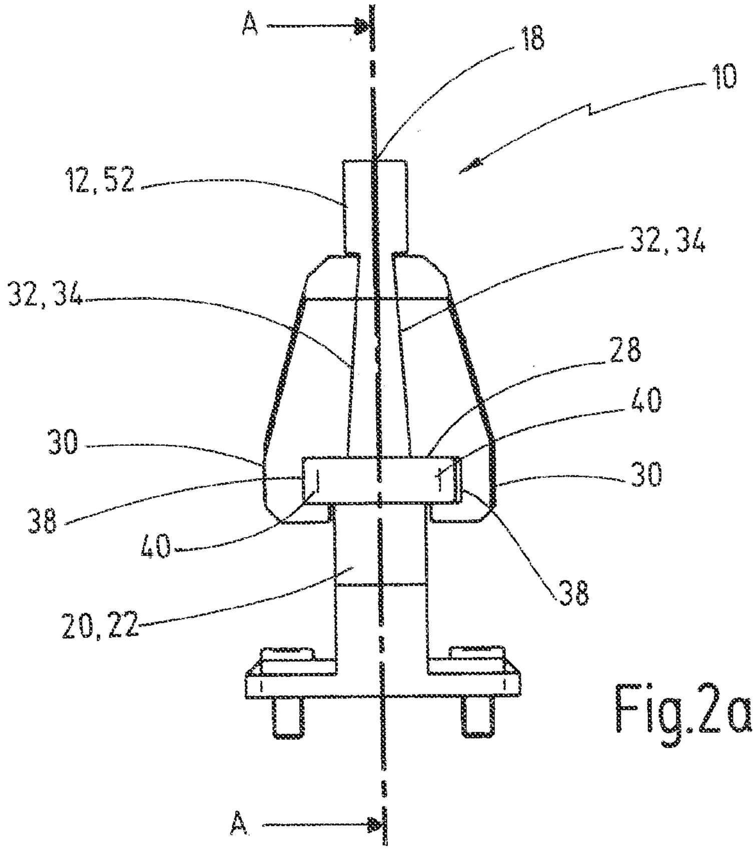
Figure 2B:
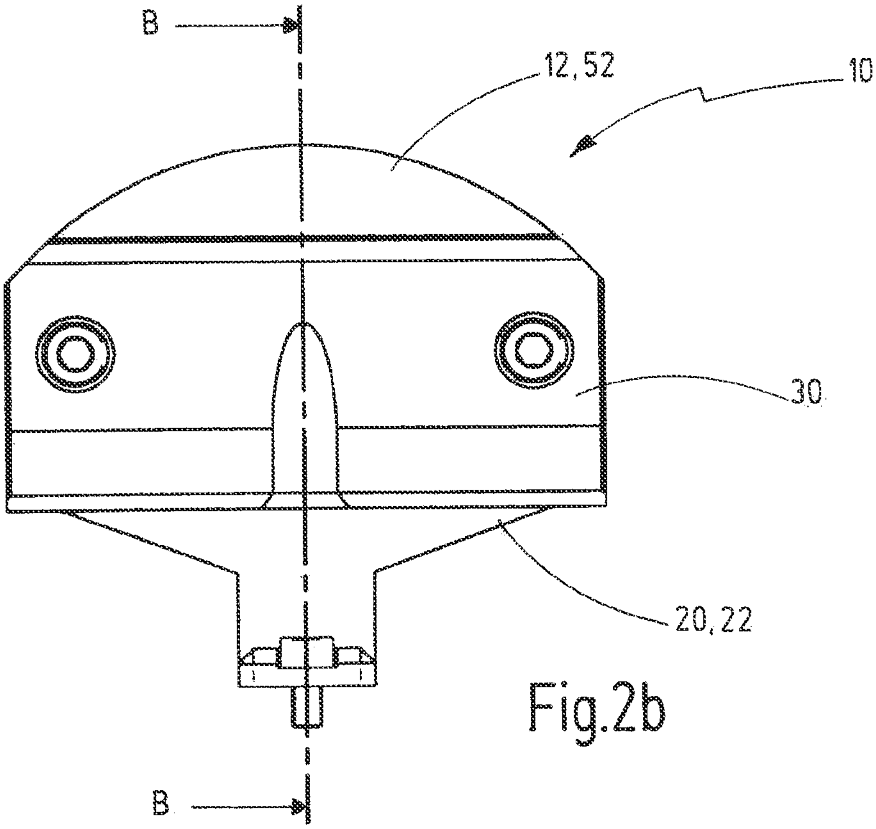
Figure 3A:
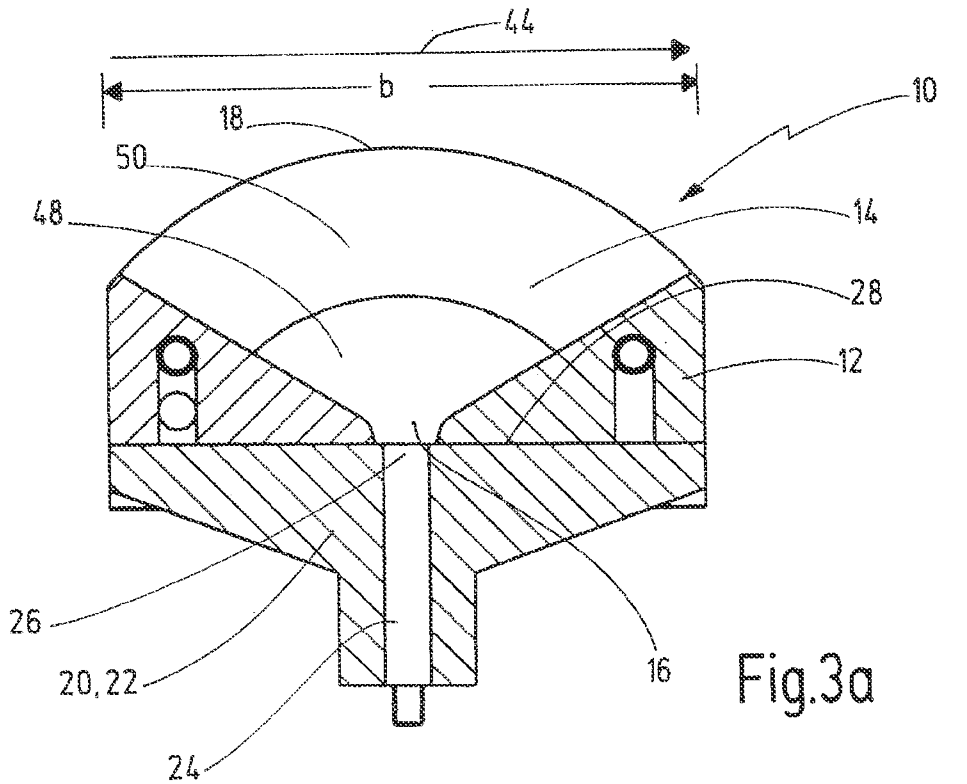
Figure 3B:
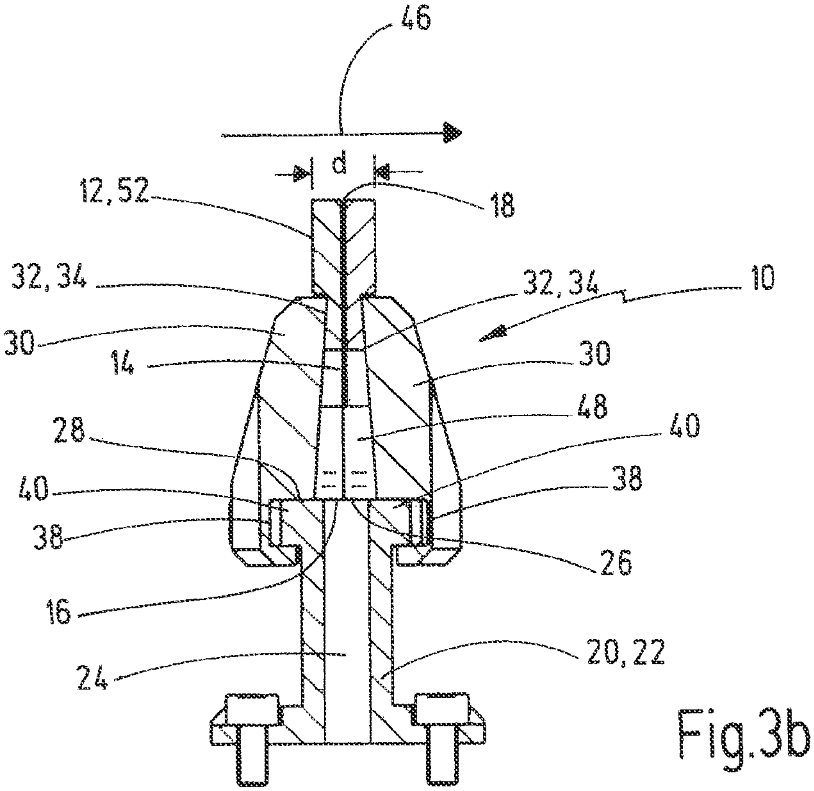
Figure 4A:
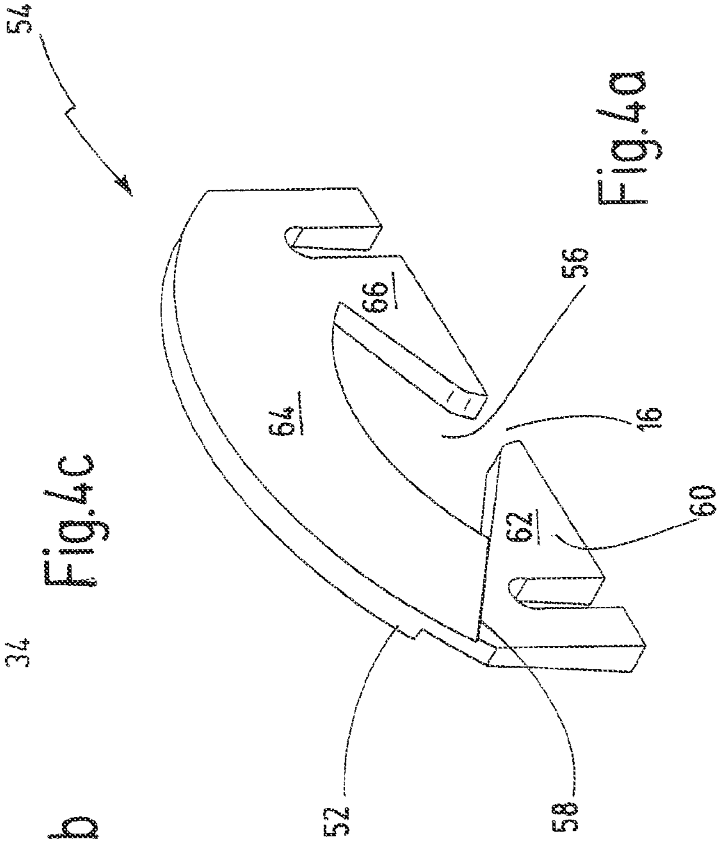
Figure 4C:
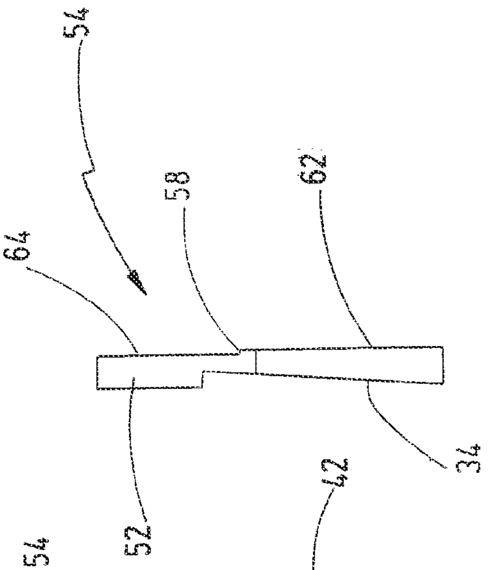
Figure 4B:
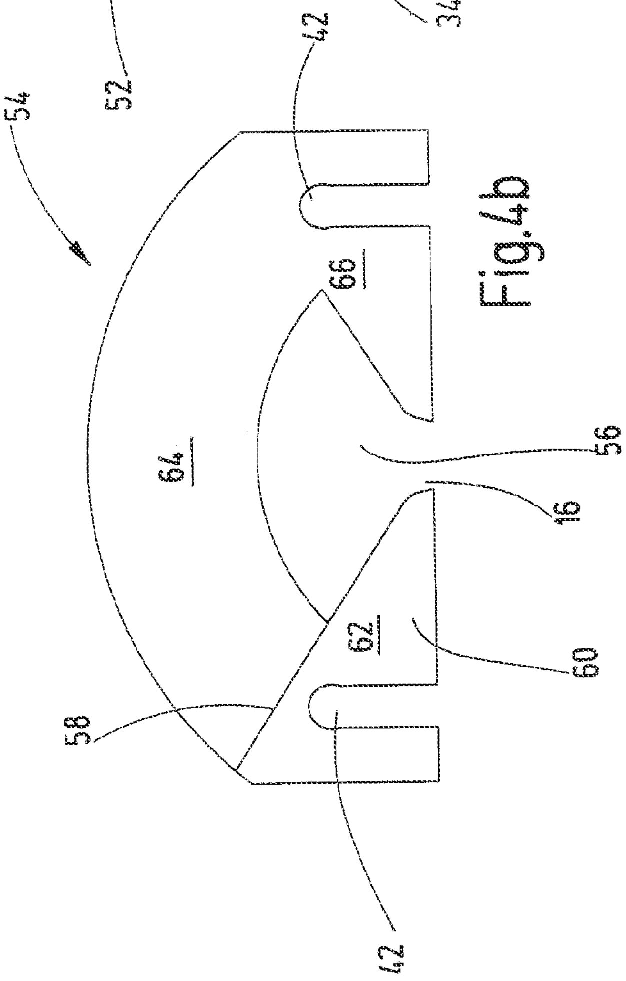
Figure 5A:
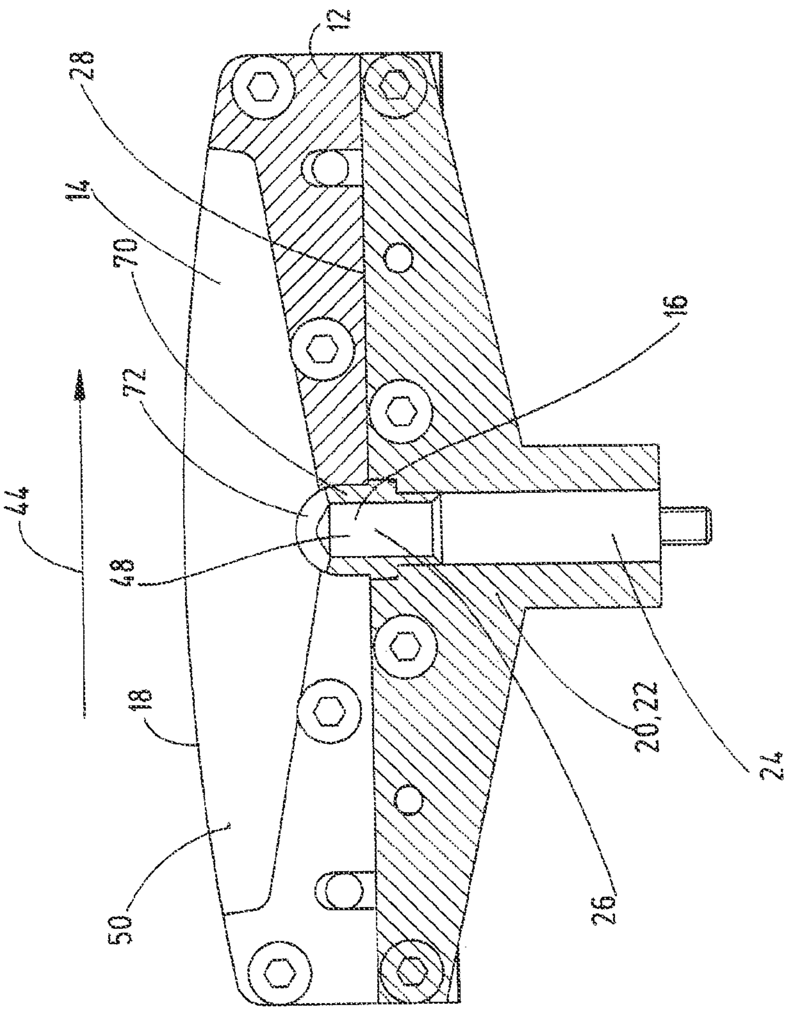
Figure 5B:
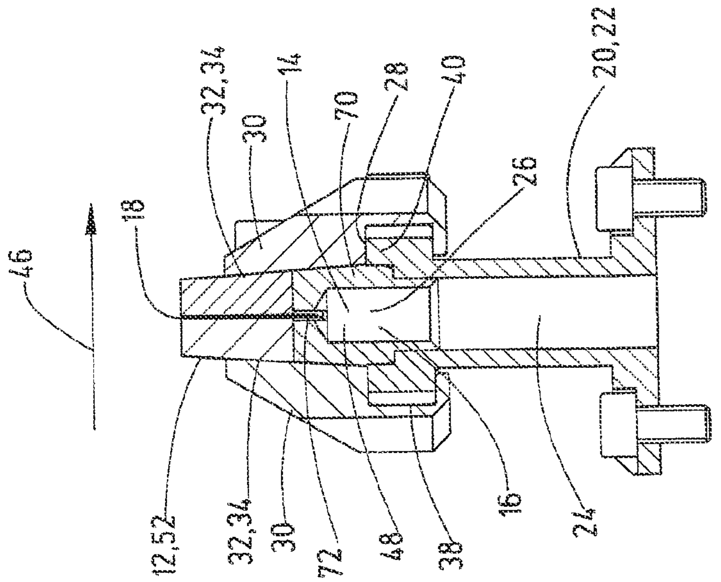

In the following, the invention will be explained in greater detail using two exemplary embodiments shown schematically in the drawing. The figures show:

FIG. 1*a*, 1*b* an application nozzle in accordance with a first exemplary embodiment, in two perspective views;

FIG. 2*a*, 2*b* the application nozzle according to FIG. 1*a*, 1*b* in a front view and in a side view;

FIG. 3*a*, 3*b* a section along the line A-A according to FIG. 2*a* and along the line B-B according to FIG. 2*b*, respectively;

FIGS. 4*a* to 4*c* a nozzle plate of the application nozzle according to FIG. 1*a*, 1*b* in a perspective view, in a side view, and in a front view, and FIG. 5*a*, 5*b* an application nozzle in accordance with a second exemplary embodiment in two sectional representations, corresponding to FIG. 3*a*, 3*b*.

The application nozzle 10 shown in the drawing, in accordance with the first exemplary embodiment, has a nozzle body 12 through which an application channel 14 for viscous material extends from a material inlet 16 to a material outlet 18. The nozzle body 12 is releasably mounted on a nozzle holder 20, which has a base body 22 through which a feed channel 24 for the viscous material extends all the way to a feed opening 26. The nozzle body 12 sits on a surface 28 of the base body 22, in which surface the feed opening 26 is situated, wherein the feed opening 26 communicates with the material inlet 16 in such a manner that the feed channel 24 opens into the application channel 14 at the feed opening 26. The nozzle holder 20 furthermore has two clamping plates 30, the clamping surfaces 32 of which, facing one another, lie against side surfaces 34 of the nozzle body 12 that face away from one another, and hold the nozzle body 12 with a clamping effect in an interstice 36 between the clamping plates 30. For fastening to the base body 22, each of the clamping plates 30 has a groove 38 in which a part 40 of the base body 22 is held, in each instance, which part is delimited in an upward direction by the surface 28. Screw openings 42 extend through the nozzle body 12 and the clamping plates 30, through which openings screws are passed, using which screws the clamping plates 30 are braced against the nozzle body 12, so that the clamping surfaces 32 are pressed against the side surfaces 34. Further screws 43 fix the clamping plate 30, which faces the viewer in FIG. 1*a*, in place on the base body 22, while furthermore a cylinder pin 45 is passed through the clamping plate 30, which faces the viewer in FIG. 1*a*, and the base body 22, and engages into a dead-end bore in the clamping plate 30 that faces away from the viewer in FIG. 1*a*.

In a first spatial direction 44, parallel to the side surfaces 34, the nozzle body 12 has a width b that is significantly greater than its thickness d, which is measured in a second spatial direction 46 that stands perpendicular to the first spatial direction 44. The application channel 14 has a first section 48 that extends from the material inlet 16 and is open toward the side surfaces 34 and is closed off on both sides, forming a seal, by means of the clamping surfaces 32. The first section 48 is followed by a second section 50 of the application channel 14, which section extends all the way to the material outlet 18. Both sections 48, 50 of the application channel 14 widen toward the material outlet 18 in the first spatial direction 44, as is particularly shown in FIG. 3*a*. This widening takes place at a constant opening angle, starting almost from the material inlet 16. In this way, a wide spray jet having a low thickness is achieved with the application nozzle 10 when applying a viscous material to a workpiece. The two side surfaces 34 furthermore do not run parallel to one another, but rather run toward one another at an acute angle of approximately 8°, proceeding from the base body 22. The same holds true for the clamping surfaces 32, which also run toward one another at an acute angle of approximately 8°, proceeding from the base body 22. Bracing of the clamping plates 30 by means of the screws then pulls the nozzle body 12 in the direction toward the base body 22 and fixes it in place, lying against this body, so that the transition from the feed channel 24 to the application channel 14 is sealed off well. Due to the configuration of the nozzle holder 20 with three separate components (base body 22, clamping plates 30), the edges of all components can be precisely ground, so that they can be precisely joined together with the nozzle body 12. A thickened end region 52 of the nozzle body 12 projects upward out of the interstice 36, facing away from the base body 22. The material outlet 18 is situated in this end region 52.

The nozzle body 12 is composed of two nozzle plates 54 that have the same construction, each of which is produced in one piece from hard metal (FIGS. 4*a* to 4*c*). Each of the nozzle plates 54 is produced from a plate-shaped blank composed of hard metal. In this regard, first a section 56 having an open edge and forming the material inlet 16 and the first section 48 of the application channel 14, in part, is introduced into the blank by means of erosion or cutting. Then the blank is ground down along an edge 58, on one side, so that a step 60 remains. The step 60 has a first contact surface 62. The step 60 is followed by a delimitation surface 64 that runs parallel to the first contact surface 62 and delimits the second section 50 of the application channel 14 toward one side. The delimitation surface 64 is followed, finally, by a second contact surface 66 that is coplanar with the former. Two nozzle plates 44 that have the same construction are loosely laid against one another to form the nozzle body 12, in that the first contact surface 62 of the one nozzle plate 54 lies flatly against the second contact surface 66 of the other nozzle plate 54, and vice versa. The second section 50 of the application channel 14 is then situated between the two delimitation surfaces 64. Fixation of the nozzle plates 54 on one another takes place by means of the clamping plates 30 and the screws.

The application nozzle 110 in accordance with the second exemplary embodiment (FIG. 5*a*, 5*b*) differs from the application nozzle 10 in accordance with the first exemplary embodiment, aside from its size and geometry, only in one detail. For this reason, the same characteristics are provided with the same reference symbols in the drawing and will not be described separately. While in the case of the first exemplary embodiment, sealing of the application channel 14 and of the feed channel 24 takes place in the region of the feed opening 26, by means of sealing contact of the nozzle plates 54, the clamping plates 30, and the base body 22 against one another, in the case of the second exemplary embodiment the first section 48 of the application channel, which, incidentally, has a constant width in the first spatial direction 44 here, also over its entire length, and an end section of the feed channel 24, which opens into the first section 48, are lined by means of a sealing element 70 composed of a thermoplastic material. The sealing element lies against the nozzle body 12, the base body 22, and the clamping plates 30 all around, and ensures improved sealing in this region. The sealing element 70 has an exit gap 72 that opens into the second section 50 of the application channel, the thickness of which gap, measured in the first spatial direction 44, is approximately as great as the thickness of the application channel 14 defined by the distance between the delimitation surfaces 64.

In summary, the following should be stated: The invention relates to an application nozzle 10 for applying a viscous material to workpieces, having a nozzle body 12 through which an application channel 14 extends from a material inlet 16 to a material outlet 18, wherein the nozzle body 12 has a width b, in a first spatial direction 44, that is greater than a thickness d measured in a second spatial direction 46 that runs perpendicular to the first spatial direction 44, and wherein the application channel 14 widens toward the material outlet 18, in the first spatial direction 44; and having a nozzle holder 20 that has a base body 22 and two clamping plates 30, wherein a feed channel 24 for the viscous material extends through the base body 22, which channel opens into the material inlet 16 at a feed opening 26, and wherein the clamping plates 30 releasably fix the nozzle body 12 in place on the base body 22, lying against side surfaces 34 of the nozzle body 12 that face away from one another. According to the invention, it is provided that the two clamping plates 30 are configured as separate components and are releasably fixed in place on the base body 22 and on the nozzle body 12, and/or that the nozzle body 12 has two nozzle plates 54 that lie flatly against one another, between which plates at least one section 50 of the application channel 14 is situated.

The invention claimed is:

1. An application nozzle for applying a viscous material to workpieces, having a nozzle body (12) through which an application channel (14) extends from a material inlet (16) to a material outlet (18), wherein the nozzle body (12) has a width (b), in a first spatial direction (44), that is greater than a thickness (d) measured in a second spatial direction (46) that runs perpendicular to the first spatial direction (44), and wherein the application channel (14) widens toward the material outlet (18), in the first spatial direction (44); and having a nozzle holder (20) that has a base body (22) and two clamping plates (30), wherein a feed channel (24) for the viscous material extends through the base body (22), which channel opens into the material inlet (16) at a feed opening (26), and wherein the clamping plates (30) releasably fix the nozzle body (12) in place on the base body (22), lying against side surfaces (34) of the nozzle body (12) that face away from one another, wherein the nozzle body (12) has two nozzle plates (54) that lie flatly against one another, between which plates at least one section (50) of the application channel (14) is situated, wherein each of the nozzle plates (54), on the side facing the other nozzle plate (54), has a delimitation surface (64) that delimits the application channel (14), at least in certain sections; a step (60) that projects out of the delimitation surface (64), having a first contact surface (62) that runs parallel to the delimitation surface (64) and lies against the other nozzle plate (54), and a second contact surface (66) that follows the delimitation surface (64) in planar manner, against which the first contact surface (62) of the other nozzle plate (54) lies, wherein the two clamping plates (30) are configured as separate components and are releasably fixed in place on the base body (22) and on the nozzle body (12), and wherein the side surfaces (34) of the nozzle body (12) are inclined at an acute angle relative to one another, proceeding from the base body (22), and wherein clamping surfaces (32) of the clamping plates (30), which surfaces lie against the side surfaces (34), are inclined at the same angle relative to one another, and wherein the clamping plates (30) lie flatly against one of the side surfaces (34) of the nozzle body (12) with a clamping surface (32), in each instance.

2. The application nozzle according to claim 1, wherein the side surfaces (34) extend, in each instance, all the way to an end region (52), which projects out of an interstice (36) between the two clamping plates (30) and has the material outlet (18), at which region the thickness of the nozzle body (12) increases.

3. The application nozzle according to claim 1, wherein the clamping plates (30) each have a groove (38) in which a part (40) of the base body (22) is held.

4. The application nozzle according to claim 1, wherein the clamping plates (30) and the nozzle body (12) are fixed in place on one another by means of at least one screw and/or at least one pin.

5. The application nozzle according to claim 1, wherein the nozzle body (12) is produced from a metal-matrix composite material in which metal carbides or metal nitrides, present in particle form, are held together by a matrix composed of metal.

6. The application nozzle according to claim 1, wherein the nozzle plates (54) have the same construction.

7. The application nozzle according to claim 1, wherein the second spatial direction (46) extends transverse to the contact surfaces (62, 66).

8. The application nozzle according to claim 1, wherein the nozzle plates (54) are produced in one piece, in each instance.

9. The application nozzle according to claim 1, wherein the application channel (14) has a first section (48) that extends from the material inlet (16) and is delimited on two sides by the clamping plates (30), and a second section (50) that extends from the material outlet (18) and is enclosed all around by the nozzle body (12).

10. The application nozzle according to claim 9, wherein the first section (48) widens in the first spatial direction (44), proceeding from the material inlet (16), toward the second section (50).

11. The application nozzle according to claim 9, wherein the first section (48) and an end section of the feed channel (24) that opens into the first section (48) at the material inlet (16) are lined, at least in part, by means of a sealing element (70) that lies against the base body (22) and against the clamping plates (30).

12. The application nozzle according to claim 11, wherein the sealing element (70) is produced in one piece from a thermoplastic material.

13. The application nozzle according to claim 11, wherein the sealing element has an exit gap (72) that opens into the second section (50), the width of which gap, measured in the first spatial direction (44), is multiple times its thickness measured in the second spatial direction (46).

14. The application nozzle according to claim 13, wherein the thickness of the exit gap is maximally twice as great as the thickness of the second section (50), measured in the second spatial direction (46).

15. The application nozzle according to claim 1, wherein the second section (50) is delimited by the steps (60) on sides that lie opposite one another.

16. A method for the production of the application nozzle (10) according to claim 15, wherein a cut-out (56) for forming the first section (48) of the application channel (14) is cut out of a plate by erosion or cutting, wherein the plate comprises a metal-matrix composite material in which metal carbides or metal nitrides, present in particle form, are held together by a matrix composed of metal, and wherein the delimitation surface (64) and the second contact surface (66) are produced by grinding along an edge (58) that delimits the step (60).

17. An application nozzle for applying a viscous material to workpieces, having a nozzle body (12) through which an application channel (14) extends from a material inlet (16) to a material outlet (18), wherein the nozzle body (12) has a width (b), in a first spatial direction (44), that is greater than a thickness (d) measured in a second spatial direction (46) that runs perpendicular to the first spatial direction (44), and wherein the application channel (14) widens toward the material outlet (18), in the first spatial direction (44); and having a nozzle holder (20) that has a base body (22) and two clamping plates (30), wherein a feed channel (24) for the viscous material extends through the base body (22), which channel opens into the material inlet (16) at a feed opening (26), wherein the clamping plates (30) releasably fix the nozzle body (12) in place on the base body (22), lying against side surfaces (34) of the nozzle body (12) that face away from one another, and wherein the nozzle body (12) has two nozzle plates (54) that lie flatly against one another, between which plates at least one section (50) of the application channel (14) is situated, wherein each of the nozzle plates (54), on the side facing the other nozzle plate (54), has a delimitation surface (64) that delimits the application channel (14), at least in certain sections; a step (60) that projects out of the delimitation surface (64), having a first contact surface (62) that runs parallel to the delimitation surface (64) and lies against the other nozzle plate (54), and a second contact surface (66) that follows the delimitation surface (64) in planar manner, against which the first contact surface (62) of the other nozzle plate (54) lies.

18. The application nozzle according to claim 17, wherein the two clamping plates (30) are configured as separate components and are releasably fixed in place on the base body (22) and on the nozzle body (12).

19. The application nozzle according to claim 18, wherein the side surfaces (34) of the nozzle body (12) are inclined at an acute angle relative to one another, proceeding from the base body (22), and wherein clamping surfaces (32) of the clamping plates (30), which surfaces lie against the side surfaces (34), are inclined at the same angle relative to one another.

20. The application nozzle according to claim 17, wherein the side surfaces (34) extend, in each instance, all the way to an end region (52), which projects out of an interstice (36) between the two clamping plates (30) and has the material outlet (18), at which region the thickness of the nozzle body (12) increases.

21. The application nozzle according to claim 17, wherein the clamping plates (30) lie flatly against one of the side surfaces (34) of the nozzle body (12) with a clamping surface (32), in each instance.

22. The application nozzle according to claim 17, wherein the clamping plates (30) each have a groove (38) in which a part (40) of the base body (22) is held.

23. The application nozzle according to claim 17, wherein the nozzle body (12) is produced from a metal-matrix composite material in which metal carbides or metal nitrides, present in particle form, are held together by a matrix composed of metal.

* * * * *